(12) United States Patent
Golden et al.

(10) Patent No.: US 7,651,384 B2
(45) Date of Patent: Jan. 26, 2010

(54) METHOD AND SYSTEM FOR POINT OF USE RECYCLING OF ECMP FLUIDS

(75) Inventors: Josh H. Golden, Santa Cruz, CA (US); Peter I. Porshnev, San Jose, CA (US); Donald Myers, Nampa, ID (US)

(73) Assignee: Applied Materials, Inc., Santa Clara, CA (US)

( * ) Notice: Subject to any disclaimer, the term of this patent is extended or adjusted under 35 U.S.C. 154(b) by 258 days.

(21) Appl. No.: 11/621,497

(22) Filed: Jan. 9, 2007

(65) Prior Publication Data

US 2008/0166958 A1    Jul. 10, 2008

(51) Int. Cl.
*B24B 57/00*    (2006.01)
(52) U.S. Cl. .................... 451/6; 451/60; 451/41
(58) Field of Classification Search ............ 451/60, 451/41, 6, 36, 37
See application file for complete search history.

(56) References Cited

U.S. PATENT DOCUMENTS

| | | | |
|---|---|---|---|
| 4,597,836 | A | 7/1986 | Schaer et al. |
| 4,696,729 | A | 9/1987 | Santini et al. |
| 5,096,550 | A | 3/1992 | Mayer et al. |
| 5,232,875 | A | 8/1993 | Tuttle et al. |
| 5,308,989 | A | 5/1994 | Brubaker |
| 5,377,708 | A | 1/1995 | Bergman et al. |
| 5,664,900 | A | 9/1997 | Matthies |
| 5,738,574 | A | 4/1998 | Tollest et al. |
| 5,755,614 | A * | 5/1998 | Adams et al. ............. 451/60 |
| 5,879,220 | A | 3/1999 | Hasegawa et al. |
| 5,932,486 | A | 8/1999 | Cook et al. |
| 6,010,317 | A | 1/2000 | Maget et al. |
| 6,030,899 | A | 2/2000 | Cook et al. |
| 6,040,011 | A | 3/2000 | Yudovsky et al. |
| 6,048,256 | A * | 4/2000 | Obeng et al. ............. 451/60 |
| 6,080,050 | A | 6/2000 | Chen et al. |
| 6,106,728 | A | 8/2000 | Iida et al. |
| 6,156,124 | A | 12/2000 | Tobin |
| 6,156,167 | A | 12/2000 | Patton et al. |
| 6,159,079 | A | 12/2000 | Zuniga et al. |
| 6,183,352 | B1 * | 2/2001 | Kurisawa ............. 451/87 |
| 6,203,622 | B1 | 3/2001 | Halpin et al. |

(Continued)

OTHER PUBLICATIONS

" The Watchdog of Chemical Analysis and Water Monitoring," Tytronics®, Sentinel 04-06, Galvanic Applied Sciences, Inc., www.galvanic.com, pp. 1-4.

(Continued)

*Primary Examiner*—Robert Rose
(74) *Attorney, Agent, or Firm*—Patterson & Sheridan

(57) ABSTRACT

The present invention generally comprises a method and an apparatus for recycling electrochemical mechanical polishing (ECMP) fluid. A selected portion of used ECMP fluid may be delivered to a recycling unit where the fluid may be refurbished. The concentration of the components that are present in the selected portion of used ECMP fluid may be measured. Based upon the measurements, individual components of the ECMP fluid may be selectively dosed into the selected portion in an amount sufficient to ensure that the selected portion of used ECMP fluid, once refurbished, contains the appropriate concentration of components. Alternatively, a predetermined amount of virgin ECMP fluid may be added to the selected portion. The refurbished ECMP fluid may be recycled into an ECMP system for use in another ECMP process.

10 Claims, 6 Drawing Sheets

U.S. PATENT DOCUMENTS

| | | | |
|---|---|---|---|
| 6,210,255 | B1 | 4/2001 | Zuniga et al. |
| 6,244,935 | B1 | 6/2001 | Birang et al. |
| 6,277,014 | B1 | 8/2001 | Chen et al. |
| 6,309,520 | B1 | 10/2001 | Woodruff et al. |
| 6,368,190 | B1 | 4/2002 | Easter et al. |
| 6,413,388 | B1 | 7/2002 | Uzoh et al. |
| 6,464,855 | B1 | 10/2002 | Chadda et al. |
| 6,572,755 | B2 | 6/2003 | Emesh et al. |
| 6,783,429 | B2 * | 8/2004 | Nicholes et al. ............. 451/6 |
| 6,841,057 | B2 | 1/2005 | Wadensweiler et al. |
| 6,863,797 | B2 | 3/2005 | Sun et al. |
| 6,866,784 | B2 * | 3/2005 | Chang et al. ............. 210/652 |
| 6,899,804 | B2 | 5/2005 | Duboust et al. |
| 7,052,599 | B2 | 5/2006 | Osuda et al. |
| 2003/0030800 | A1 | 2/2003 | Golden et al. |
| 2003/0049850 | A1 | 3/2003 | Golden et al. |
| 2003/0049858 | A1 | 3/2003 | Golden et al. |
| 2004/0046121 | A1 | 3/2004 | Golden et al. |
| 2005/0218010 | A1 | 10/2005 | Wang et al. |

OTHER PUBLICATIONS

Bibby, et al. "CMP CoO Reduction: Slurry Reprocessing," Thin Solid Films, vols. 308-309, Oct. 31, 1997, pp. 538-542.

Capitanio et al. "Defect Reduction during Chemical Mechanical Planarization by Incorporation of Slurry Filtration," paper presented at the Workshop on Contamination in Liquid Chemical Distribution Systems, San Francisco, CA, Jul. 13-15, 1998.

Cooper "Effects of Particle Concentration on Chemical Mechanical Planarization," Electrochemical and Solid-State Letters, vol. 5, No. 12, 2002, pp. G109-G112.

Du, et al. "Mechanistic Studies of Cu Electropolishing in Phosphoric Acid Electrolytes," Journal of The Electrochemical Society, vol. 151, No. 6, (2004), pp. C375-C378.

Huo, et al. "Electrochemical Polishing of Patterned Copper Films". International Technology Roadmap for Semiconductors: Executive Summary, ITRS, 2003.

Kim, et al. "Physical and Chemical Characterization of Reused Oxide Chemical Mechanical Planarization Slurry," Japanese Journal of Applied Physics 40, part 1, No. 3a (2001), pp. 1236-1239.

Kodama "A Reclaim Use of CMP Slurry," in Proceedings of the $29^{th}$ Symposium on ULSI Ultra Clean Technology (Tokyo: Ultra Clean Society, 1996), pp. 67-73.

Levy, et al. "Analytical and Functional Characterization of Recycled Fumed Silica Slurries in ILD CMP," Abs. 928, $204^{th}$ Meeting, The Electrochemical Society, Inc., 2003.

Liu, et al. "Cu Planarization in Electrochemical Mechanical Planarization," Journal of The Electrochemical Society, vol. 153, No. 6, 2006, pp. C377-C381.

Liu, et al. "Roles of Additives in Damascene Copper Electropolishing," Journal of The Electrochemical Society, vol. 153, No. 6, 2006, pp. C428-C433.

Liu, et al. "Two-Additive Electrolytes for Superplanarizing Damascene Cu Metals," Electrochemical and Solid-State Letters, vol. 8, No. 3, 2005, pp. C47-C50.

West, et al. "Electrochemical Planarization of Interconnect Metallization," IBM J. Res. & Dev., vol. 49, No. 1, Jan. 2005, pp. 37-48.

\* cited by examiner

METHOD AND SYSTEM FOR POINT OF USE RECYCLING OF ECMP FLUIDS

BACKGROUND OF THE INVENTION

1. Field of the Invention

Embodiments of the present invention generally relate to a method and an apparatus for recycling an electrochemical mechanical polishing (ECMP) fluid.

2. Description of the Related Art

ECMP is a technique used to remove conductive materials from a substrate surface by electrochemical dissolution while concurrently polishing the substrate with reduced mechanical abrasion compared to conventional planarization processes. ECMP systems may generally be adapted for deposition of conductive material on the substrate by reversing the polarity of the bias. Electrochemical dissolution is performed by applying a bias between a cathode and a substrate surface to remove conductive materials from the substrate surface into a surrounding electrolyte. The bias may be applied to the substrate surface by a conductive polishing material on which the substrate is processed. A mechanical component of the polishing process is performed by providing relative motion between the substrate and the conductive polishing material that enhances the removal of the conductive material from the substrate.

During ECMP processing, ECMP fluid may be provided to the ECMP system to process the substrate. The ECMP fluid may be continuously recirculated to the platen during polishing and then drained and discarded once processing is completed. Therefore, there is a need in the art for a method and apparatus for providing ECMP fluid to an ECMP system for polishing substrates.

SUMMARY OF THE INVENTION

The present invention generally comprises a method and an apparatus for recycling ECMP fluid. A selected portion of used ECMP fluid may be delivered to a recycling unit where the fluid may be refurbished. The concentration of the components that are present in the selected portion of used ECMP fluid may be measured. Based upon the measurements, individual components of the ECMP fluid may be selectively dosed into the selected portion in an amount sufficient to ensure that the selected portion of used ECMP fluid, once refurbished, contains the appropriate concentration of components. Alternatively, a predetermined amount of virgin ECMP fluid may be added to the selected portion. The refurbished ECMP fluid may be recycled into an ECMP system for use in another ECMP process.

In one embodiment, an electrochemical mechanical polishing fluid recycling method is disclosed. The method comprises selectively capturing a portion of used electrochemical mechanical polishing fluid, refurbishing the selected portion, and providing the refurbished electrochemical mechanical polishing fluid to an electrochemical mechanical polishing station for use as an electrochemical mechanical polishing fluid. The used electrochemical mechanical polishing fluid is free of excess water from rinse or other process steps, and the selective capturing leaves at least a portion of used electrochemical mechanical polishing fluid uncaptured.

In another embodiment, an electrochemical mechanical polishing fluid recycling method is disclosed. The method comprises selectively capturing a first portion of used electrochemical mechanical polishing fluid from a first electrochemical mechanical polishing station, refurbishing the first selected portion to create a first refurbished electrochemical mechanical polishing fluid, providing the first refurbished electrochemical mechanical polishing fluid to an electrochemical mechanical polishing station for use as an electrochemical mechanical polishing fluid, selectively capturing a third portion of used electrochemical mechanical polishing fluid from a second electrochemical mechanical polishing station different from the first electrochemical mechanical polishing station, refurbishing the third selected portion to create a third refurbished electrochemical mechanical polishing fluid, and providing the third refurbished electrochemical mechanical polishing fluid to an electrochemical mechanical polishing station for use as an electrochemical mechanical polishing fluid. The first portion of used electrochemical mechanical polishing fluid is free of excess water from rinse or other process steps, and the selective capturing leaving at least a second portion of used electrochemical mechanical polishing fluid uncaptured. The third portion of used electrochemical mechanical polishing fluid is free of excess water from rinse or other process steps, and the selective capturing leaving at least a fourth portion of used electrochemical mechanical polishing fluid uncaptured.

In yet another embodiment, an apparatus is disclosed. The apparatus comprises an electrochemical mechanical polishing tool having a chamber, at least one electrochemical mechanical polishing station, at least one electrochemical mechanical polishing fluid inlet, a controller, and at least one drain. The apparatus also comprises at least one recycling unit coupled with the at least one drain and the at least one electrochemical mechanical polishing fluid inlet. The recycling unit comprises at least one valve coupled with the controller that selectively opens to allow a selected portion of used electrochemical mechanical polishing fluid to enter the at least one recycling unit, at least one measuring device for measuring the chemical composition of the used electrochemical mechanical polishing fluid, a replenishment system for replenishing the used electrochemical mechanical polishing fluid as a function of the measured chemical composition, and at least one outlet coupled with the at least one electrochemical mechanical polishing fluid inlet.

In still another embodiment, an electrochemical mechanical polishing fluid recycling unit is disclosed. The recycling unit comprises at least one valve coupled with a controller that selectively opens to allow a selected portion of used electrochemical mechanical polishing fluid to enter the at least one recycling unit and a replenishment system for replenishing the used electrochemical mechanical polishing fluid, the replenishment system coupled with one or more device selected from the group consisting of: an unused electrochemical mechanical polishing fluid source, a dosing system, a measuring device, and combinations thereof.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present invention generally comprises a method and an apparatus for recycling ECMP fluid. A selected portion of used ECMP fluid may be delivered to a recycling unit where the fluid may be refurbished. The concentration of the components that are present in the selected portion of used ECMP fluid may be measured. Based upon the measurements, individual components of the ECMP fluid may be selectively dosed into the selected portion in an amount sufficient to ensure that the selected portion of used ECMP fluid, once refurbished, contains the appropriate concentration of components. Alternatively, a predetermined amount of virgin ECMP fluid may be added to the selected portion. The refurbished ECMP fluid may be recycled into an ECMP system for use in another ECMP process.

Figure 1:
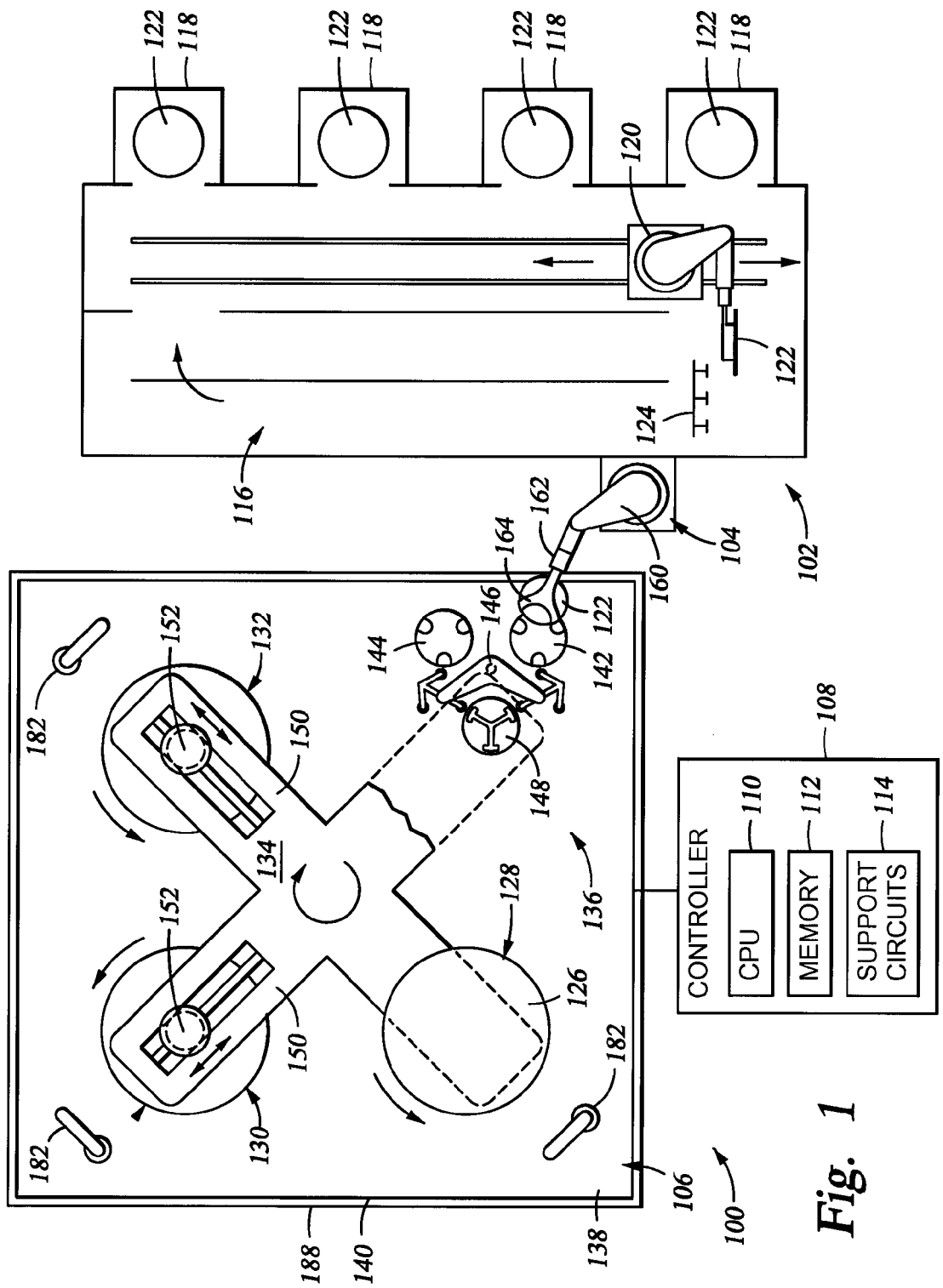
FIG. 1 is a plan view of an ECMP system 100.

FIG. 1 is a plan view of one embodiment of a planarization system 100 having an apparatus for electrochemically processing a substrate. The exemplary system 100 generally comprises a factory interface 102, a loading robot 104, and a planarizing module 106. The loading robot 104 may be disposed proximate the factory interface 102 and the planarizing module 106 to facilitate the transfer of substrates 122 therebetween.

A controller 108 is provided to facilitate control and integration of the modules of the system 100. The controller 108 comprises a central processing unit (CPU) 110, a memory 112, and support circuits 114. The controller 108 may be coupled to the various components of the system 100 to facilitate control of, for example, the planarizing, cleaning, recycling/refurbishing, and transfer processes.

The factory interface 102 may include a cleaning module 116 and one or more wafer cassettes 118. An interface robot 120 may be employed to transfer substrates 122 between the wafer cassettes 118, the cleaning module 116 and an input module 124. The input module 124 may be positioned to facilitate the transfer of substrates 122 between the planarizing module 106 and the factory interface 102 by grippers 164, for example vacuum grippers or mechanical clamps on a rotating arm 160 having a positioning portion 162.

The planarizing module 106 may include at least a first ECMP station 128, disposed in an environmentally controlled enclosure 188. Examples of planarizing modules 106 that may be adapted to benefit from the invention include MIRRA®, MIRRA MESA™, REFLEXION®, REFLEXION® LK, and REFLEXION® LK Ecmp™ Chemical Mechanical Planarizing Systems, all available from Applied Materials, Inc. of Santa Clara, Calif. Other planarizing modules, including those that use processing pads, planarizing webs, or a combination thereof, and those that move a substrate relative to a planarizing surface in a rotational, linear or other planar motion may also be adapted to benefit from the invention.

In the embodiment depicted in FIG. 1, the planarizing module 106 includes the first ECMP station 128, a second ECMP station 130 and a third ECMP station 132. Bulk removal of conductive material disposed on the substrate 122 may be performed through an electrochemical dissolution process at the first ECMP station 128. After the bulk material removal at the first ECMP station 128, the remaining conductive material is removed from the substrate at the second ECMP station 130 through a multi-step electrochemical mechanical process, wherein part of the multi-step process is configured to remove residual conductive material. It is contemplated that more than one ECMP station may be utilized to perform the multi-step removal process after the bulk removal process performed at a different station. Alternatively, each of the first and second ECMP stations 128, 130 may be utilized to perform both the bulk and multi-step conductive material removal on a single station. It is also contemplated that all ECMP stations (for example 3 stations of the module 106 depicted in FIG. 1) may be configured to process the conductive layer with a two step removal process.

The exemplary planarizing module 106 also includes a transfer station 136 and a carousel 134 that are disposed on an upper or first side 138 of a machine base 140. In one embodiment, the transfer station 136 includes an input buffer station 142, an output buffer station 144, a transfer robot 146, and a load cup assembly 148. The input buffer station 142 receives substrates 122 from the factory interface 102 by means of the loading robot 104. The loading robot 104 may also be utilized to return polished substrates 122 from the output buffer station 144 to the factory interface 102. The transfer robot 146 may be utilized to move substrates 122 between the buffer stations 142, 144 and the load cup assembly 148.

In one embodiment, the transfer robot 146 includes two gripper assemblies, each having pneumatic gripper fingers that hold the substrate 122 by the substrate's edge. The transfer robot 146 may simultaneously transfer a substrate 122 to be processed from the input buffer station 142 to the load cup assembly 148 while transferring a processed substrate from the load cup assembly 148 to the output buffer station 144. An example of a transfer station that may be used to advantage is described in U.S. Pat. No. 6,156,124, issued Dec. 5, 2000 to Tobin, which is herein incorporated by reference in its entirety.

The carousel 134 is centrally disposed on the base 140. The carousel 134 may include a plurality of arms 150, each supporting a planarizing head assembly 152. Two of the arms 150 depicted in FIG. 1 are shown in phantom such that the transfer station 136 and a planarizing surface 126 of the first ECMP station 128 may be seen. The carousel 134 is indexable such that the planarizing head assemblies 152 may be moved between the planarizing stations 128, 130, 132 and the transfer station 136. One carousel that may be utilized to advantage is described in U.S. Pat. No. 5,804,507, issued Sep. 8, 1998 to Perlov, et al., which is hereby incorporated by reference in its entirety.

A conditioning device 182 is disposed on the base 140 adjacent each of the planarizing stations 128, 130, 132. The conditioning device 182 periodically conditions the planarizing material disposed in the stations 128, 130, 132 to maintain uniform planarizing results. Each ECMP station 128, 130, 132 may have its own dedicated recycling/refurbishing unit. In one embodiment, a single recycling unit services all of the ECMP stations 128, 130, 132.

Figure 2:
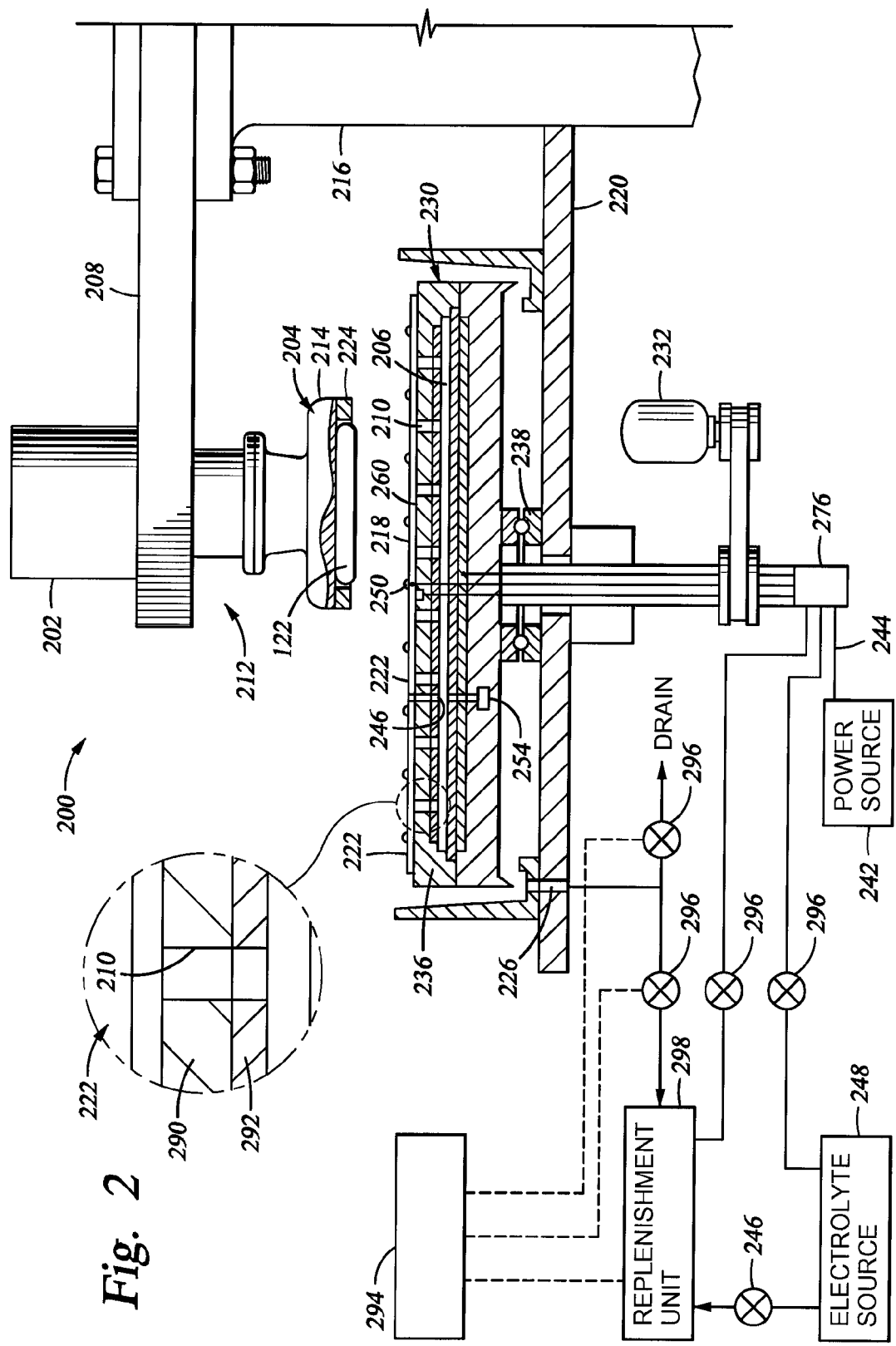
FIG. 2 is a sectional view of one embodiment of an ECMP station 200.

FIG. 2 depicts a sectional view of a planarizing head assembly 212 positioned over one embodiment of an ECMP station 200. The planarizing head assembly 212 generally comprises a drive system 202 coupled to a planarizing head 204. The drive system 202 generally provides at least rotational motion to the planarizing head 204. The planarizing head 204 additionally may be actuated toward the ECMP station 200 such that the substrate 122 retained in the planarizing head 204 may be disposed against the planarizing surface 218 of the ECMP station 200 during processing. The drive system 202 is coupled to the controller 294 that provides a signal to the drive system 202 for controlling the rotational speed and direction of the planarizing head 204. The planarizing head assembly 212 may be supported by an arm 208 that moved on a carousel 216.

In one embodiment, the planarizing head may be a TITAN HEAD™ or TITAN PROFILER™ wafer carrier manufactured by Applied Materials, Inc. Generally, the planarizing head 204 comprises a housing 214 and retaining ring 224 that defines a center recess in which the substrate 122 is retained. The retaining ring 224 circumscribes the substrate 122 disposed within the planarizing head 204 to prevent the substrate from slipping out from under the planarizing head 204 while processing. The retaining ring 224 may be made of plastic materials such as PPS, PEEK, and the like, or conductive materials such as stainless steel, Cu, Au, Pd, and the like, or some combination thereof. It is further contemplated that a conductive retaining ring 224 may be electrically biased to control the electric field during ECMP. Conductive or biased retaining rings tend to slow the polishing rate proximate the edge of the substrate. It is contemplated that other planarizing heads may be utilized.

The ECMP station 200 may include a platen assembly 230 that is rotationally disposed on the base 220. The platen assembly 230 is supported above the base 220 by a bearing 238 so that the platen assembly 230 may be rotated relative to the base 220. An area of the base 220 circumscribed by the bearing 238 is open and provides a conduit for the electrical, mechanical, pneumatic, control signals and connections communicating with the platen assembly 230.

Conventional bearings, rotary unions and slip rings, collectively referred to as rotary coupler 276, may be provided such that electrical, mechanical, fluid, pneumatic, control signals and connections may be coupled between the base 220 and the rotating platen assembly 230. The platen assembly 230 may be coupled to a motor 232 that provides the rotational motion to the platen assembly 230. The motor 232 may be coupled to the controller 294 that provides a signal for controlling the rotational speed and direction of the platen assembly 230.

A top surface 260 of the platen assembly 230 supports a processing pad assembly 222 thereon. The processing pad assembly may be retained to the platen assembly 230 by magnetic attraction, vacuum, clamps, adhesives and the like. A plenum 206 is defined in the platen assembly 230 to facilitate uniform distribution of electrolyte to the planarizing surface 218. A plurality of passages, described in greater detail below, are formed in the platen assembly 230 to allow electrolyte, provided to the plenum 206 from an electrolyte source 248 and recycling unit 298, to flow uniformly though the platen assembly 230 and into contact with the substrate 122 during processing. It is contemplated that different electrolyte compositions may be provided during different stages of processing or at different ECMP stations 200.

The processing pad assembly 222 includes an electrode 292 and at least a planarizing portion 290. The electrode 292 may be comprised of a conductive material, such as stainless steel, copper, aluminum, gold, silver and tungsten, among others. The electrode 292 may be solid, impermeable to electrolyte, permeable to electrolyte or perforated. At least one contact assembly 250 extends above the processing pad assembly 222 and may be adapted to electrically couple the substrate being processed on the processing pad assembly 222 to the power source 242. The electrode 292 is also coupled to the power source 242 so that an electrical potential may be established between the substrate 122 and electrode 292.

A meter 244 is provided to detect a metric indicative of the electrochemical process. The meter 244 may be coupled or positioned between the power source 242 and at least one of the electrode 292 or contact assembly 250. The meter 244 may also be integral to the power source 242. In one embodiment, the meter 244 is configured to provide the controller 294 with a metric indicative of processing, such a charge, current and/or voltage. This metric may be utilized by the controller 294 to adjust the processing parameters in-situ or to facilitate endpoint or other process stage detection.

A window 246 is provided through the pad assembly 222 and/or platen assembly 230, and is configured to allow a sensor 254, positioned below the pad assembly 222, to sense a metric indicative of polishing performance. For example, the sensor 254 may be an eddy current sensor or an interferometer, among other sensors. The metric, provided by the sensor 254 to the controller 294, provides information that may be utilized for processing profile adjustment in-situ, endpoint detection or detection of another point in the electrochemical process. In one embodiment, the sensor 254, an interferometer capable of generating a collimated light beam, which during processing, is directed at and impinges on a side of the substrate 122 that is being polished. The interference between reflected signals is indicative of the thickness of the conductive layer of material being processed. One sensor that may be utilized to advantage is described in U.S. Pat. No. 5,893,796, issued Apr. 13, 1999, to Birang, et al., which is hereby incorporated by reference in its entirety.

Embodiments of the processing pad assembly 222 suitable for removal of conductive material from the substrate 122 may generally include a planarizing surface 218 that is substantially dielectric. Other embodiments of the processing pad assembly 222 suitable for removal of conductive material from the substrate 122 may include a planarizing surface 218 that is substantially conductive. At least one contact assembly 250 is provided to couple the substrate to the power source 242 so that the substrate may be biased relative to the electrode 292 during processing. Apertures 210, formed through the planarizing layer 290, allow the electrolyte to establish a conductive path between the substrate 122 and electrode 292.

In one embodiment, the planarizing portion 290 of the processing pad assembly 222 is a dielectric, such as polyurethane. Examples of processing pad assemblies that may be adapted to benefit from the invention are described in United States Patent Publication No. 2004/0023610 A1 and United States Patent Publication No. 2004/0020789 A1, both of which are hereby incorporated by reference in their entireties.

The ECMP fluid that is used to planarize the substrate may be recycled through a recycling unit 298. Numerous valves 296 may be opened and closed to control the flow of fluid into and out of the recycling unit 298, the ECMP station 200, and the electrolyte source 248 based upon instructions from the control unit 294. Examples of formulations and contents of ECMP fluids that may be used and recycled are disclosed in U.S. Pat. Nos. 6,899,804, 6,863,797, and U.S. Patent Publication No. 2005/0218010, each of which is hereby incorporated by reference in their entireties.

ECMP fluids may be recycled easier than CMP slurries because slurry particle homogeneity, concentration, and size distribution, which are critical components for the CMP slurry, are not critical to ECMP fluids. In CMP slurries, it is difficult to make the particle homogeneity, concentration, and size distribution of a recycled CMP slurry sufficiently match a virgin CMP slurry. Careful filtration, copper removal, and chemical reconstitution may be necessary to ensure that a recycled copper CMP slurry sufficiently meets the requirements achieved by the virgin copper CMP slurry. The by-products and the dilution of the CMP slurry may determine the ability and effects of recycling.

ECMP fluids, on the other hand, may contain less than 1% solids. When polishing copper, the copper is removed using the ECMP fluid by electrochemical deplating and thus, may not depend upon the abrasive particle concentration, homogeneity, and size distribution. After polishing, the ECMP fluid may comprise a mixture of highly buffered aqueous ionic electrolyte and some suspended solids from a buffing process that may occur after the ECMP process or hybrid ECMP processes that include abrasives or further steps utilizing some abrasives. The used ECMP fluid may contain buffering agents, inhibitors, surfactants, metal complexing agents, and some copper. In one embodiment, the amount of copper is less than about 100 ppm.

ECMP fluids may be recycled by filtration, copper removal, chemical reconstitution, water stripping, and combinations thereof. Positioning an ECMP recycling unit on site for immediately reuse and recirculation of the ECMP fluid may be beneficial. In one embodiment, an ECMP recycling unit may be coupled with the ECMP tool to recycle and refurbish the ECMP fluid directly after use. In another embodiment, the ECMP fluid may be removed offsite and refurbished and recycled for use at a later time in the same or a different ECMP tool.

During or after an ECMP process is completed, the ECMP station may be rinsed with deionized water. The deionized water, if mixed with the ECMP fluid, will dilute the ECMP fluid. To avoid ECMP fluid dilution, a separate drain may be provided so that the ECMP fluid and the rinsing deionized water will exit the ECMP station through separate drains. A controller coupled with the ECMP station may ensure that the proper valves are open at the appropriate times to ensure that the deionized water rinse drains through the proper drain and the ECMP fluid drains through the proper drain. If the deionized water mixes with the ECMP fluid, the deionized water may need to be separated from the ECMP fluid. The deionized water may be separated from the ECMP fluid using processes such as dialysis, reverse osmosis, and air stripping.

In one embodiment, the ECMP fluid and the rinsing water flow through the same drain. Thus, rinsing water may be present in the drain when the used ECMP fluid flows into the drain. In order to ensure that the used ECMP fluid is as free of rinsing water as possible, a selected portion (i.e., a pure cut) of used ECMP fluid may be taken from the ECMP fluid drained from the ECMP station. The used ECMP fluid may be broken into three separate portions. The first portion is the initial ECMP fluid drained out of the station that passes through the drainage conduit through which the rinse waters have flowed. Because residual rinse water may be present in the conduit, the first portion may have excess rinse water. The second portion is the last portion of ECMP fluid drained out of the station. As the ECMP fluid is drained, rinse waters may be started to speed up substrate throughput. As such, it may be possible for rinse water to be present in the last portion as it drains out of the station. The third portion is the remaining portion of the ECMP fluid. In other words, the third portion, which is the selected portion, is the portion between the first portion to enter the drain and the last portion to enter the drain. The third or selected portion is the portion of the used ECMP fluid drained from the ECMP station that is least likely to have rinse water present therein.

Once the ECMP fluid is removed from the ECMP station, it may be placed in a holding tank for later recycling or sent directly to a recycling unit for refurbishing prior to reuse. The refurbished ECMP fluid may be used with the same platen or may be used on a different platen. For example, when using the ECMP tool shown in FIG. 1, the ECMP fluid recycled from the first ECMP station 128 may be used on the second or third ECMP stations 130, 132. Recycled ECMP fluid from the second and third ECMP stations 130, 132 may be used in a similar manner. In one embodiment, the recycled ECMP fluid is used within the same ECMP station from which the used ECMP fluid was drawn.

The amount of copper present in the ECMP fluid may be measured to determine whether or not the copper concentration is below a predetermined threshold value. If the copper content is above the threshold value, then the copper may be removed by ion-exchange, precipitation, absorption onto other media, electrochemical reduction, and the like. In order to ensure copper cations are captured and removed while other cations remain, chelating agents and copper specific ion-exchange resins may be used. If additional cations besides the copper cations are removed, the chemical make-up of the ECMP fluid may change and thus, render the recycled ECMP fluid unsuitable for use within the desired ECMP fluid mixture. In such a situation, the ECMP fluid may need to be dosed with additional chemical components to refurbish the ECMP fluid. In one embodiment, potassium containing chelating and/or buffering agents may be used. In another embodiment, ammonium chelating and/or buffering agents may be used. Copper specific chelating resins that may be used include resins that uptake a transition metal ion over a Group 1 or Group 2 cation and may be purchased from suppliers such as ResinTech, Dow, Purolite, Bayer, Rohm & Haas, and others. Specific resins that may be used include iminodiacetic (IDA), aminophosphonic, and bis-picolylamine.

In one embodiment, a copper cation may be exchanged with a resin that is proton based, sodium based, potassium based, or ammonium based. For example, by exchanging two protons for one copper 2+ ion, the pH of the ECMP fluid may eventually be lowered. The main point of the ion-exchange mechanism for copper removal is that the chemical entity that is exchanged for the copper cation does not negatively impact the ECMP fluid for reuse.

The ECMP fluid may be refurbished by adjusting the pH of the fluid. The pH of the ECMP fluid may be measured (as discussed below) and then an appropriate amount of base or acid may be selectively dosed into the ECMP fluid to change the pH of the ECMP fluid to the desired value. The addition of pH buffering agents such as citric acid or phosphoric acid for the control of pH within a desired range or at a fixed value may be desired.

In one embodiment, the ECMP fluid may be refurbished by adding specific chemicals to the fluid. Accelerators, inhibitors, surfactants, wetting agents, and other chemicals may be selectively added to the ECMP fluid in sufficient quantity to enable the used EMCP fluid to obtain the chemical properties and concentration present in a virgin ECMP fluid. The individual components may be selectively added or dosed into the selected portion of used ECMP fluid based upon the measured chemical concentration of the components in comparison with the predetermined chemical concentration present in the virgin ECMP fluid. Once the measured concentration is compared to the predetermined concentration, the necessary amount of chemical component to be added to the selected portion of used ECMP fluid is known. In one embodiment, no measuring occurs and a predetermined amount of selected components are dosed into the selected portion.

In one embodiment, the used ECMP fluid may be refurbished by adding a predetermined amount of virgin ECMP fluid to the selected portion. In one embodiment, the virgin ECMP fluid may be added to the selected portion in an amount based upon a comparison of the measured chemical component concentration of the ECMP fluid to the virgin ECMP fluid. The virgin ECMP fluid may dilute any copper present in the selected portion of used ECMP fluid and also provide fresh chemical components to the ECMP fluid for further use. In one embodiment, no measuring occurs and a predetermined amount of virgin ECMP fluid is dosed into the selected portion.

The concentration of the components that are present in the ECMP fluid may be determined by a measurement device integrated with the ECMP recycle station. The measuring may take place before ECMP processing, after ECMP processing, or both. By measuring both before and after processing, the states of the before and after EMCP fluids may be compared to ensure efficacy of fluid processing and/or prequalification of the ECMP fluids and/or identification of any undesired chemical components that may negatively impact the ECMP process. The measurement that occurs after processing may be compared to a predetermined concentration to determine how much of an individual component may be dosed into the selected portion of used ECMP fluid. Examples of chemical properties and measurements that may occur include total organic carbon concentration, pH, conductivity, copper concentration, total suspended solids, turbidity, and others. The measurements may be made by Raman spectroscopy, UV-visible spectroscopy, infrared spectroscopy, near-infrared spectroscopy, index of refraction, and other well known measurement processes.

The ECMP fluid may be recirculated through a loop or alternate pathway until it is reused. When in the recirculation loop or pathway, filtration, abatement, reconstitution, metrology, or other processed may be performed on the fluid to optimize the physiochemical characteristics of the fluid. The fluid may be reprocessed in a batch mode or in a tank or in a continuous mode.

Figure 3:
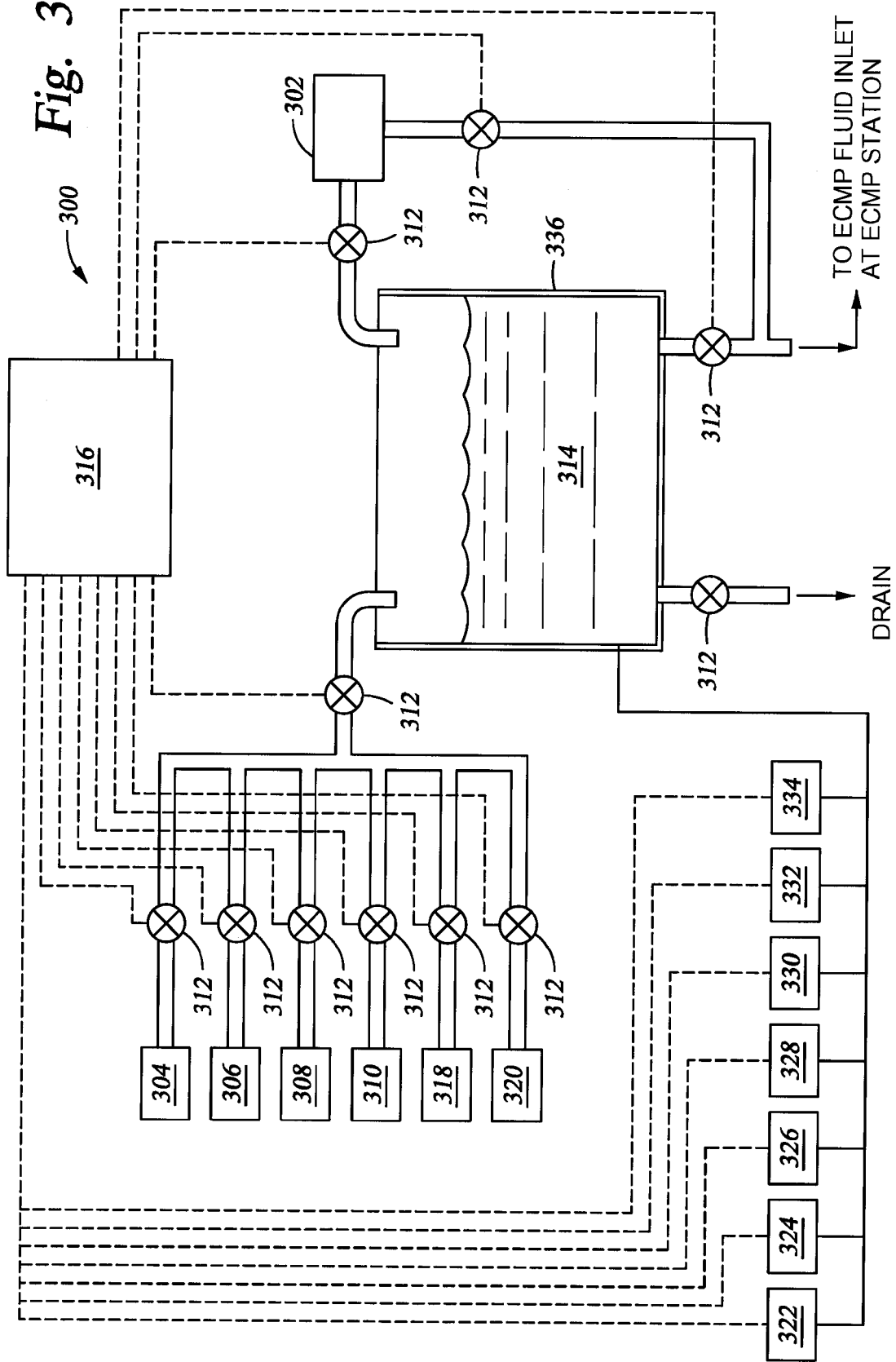
FIG. 3 is a schematic representation of a recycling unit 300 according to one embodiment of the invention.

FIG. 3 is a schematic representation of a recycling unit 300 according to one embodiment of the invention. The recycling unit 300 may comprise a holding tank 336 wherein the selected portion of used ECMP fluid 314 may collect. One or more measurement devices may be coupled with the recycling unit 300. The measurement devices may include a Raman spectroscopy measuring source 322, UV-visible spectroscopy source 324, infrared spectroscopy source 326, near-infrared spectroscopy source 328, index of refraction measurement source 330, ECMP fluid conductivity measurement source 332, and pH measurement source 334.

Based upon measurements taken from the measurement devices, one or more chemical components may be added to the selected portion of used ECMP fluid 314 through a dosing system. The dosing system may comprise an accelerator source 304, an inhibitor source 306, a surfactant source 308, a wetting agent source 310, an acid source 318, a base source 320, or any other chemical components deemed useful and necessary for refurbishment of the ECMP fluid. Alternatively, should the measurements revel that the fluid is no longer salvageable, the fluid may be drained from the tank 336 and discarded.

The virgin ECMP fluid source 302 may be coupled with the recycling unit 300 to introduce virgin ECMP fluid to the tank 336 and/or to an outlet of the tank 336 which leads to an ECMP station. The virgin ECMP fluid may be combined with the selected portion of ECMP fluid 314 in an amount based upon measurements from the measuring devices or the virgin ECMP fluid may be combined in a predetermined amount.

A controller 316 may be electrically coupled with the measuring devices and the various valves 312 of the recycling unit 300 to control when the measuring occurs, if at all, what measurements occur, the amount of each component dosed into the ECMP fluid, the amount of virgin ECMP fluid added to the selected portion of used ECMP fluid, and the amount of refurbished ECMP fluid recycled back to an ECMP station.

Figure 4:
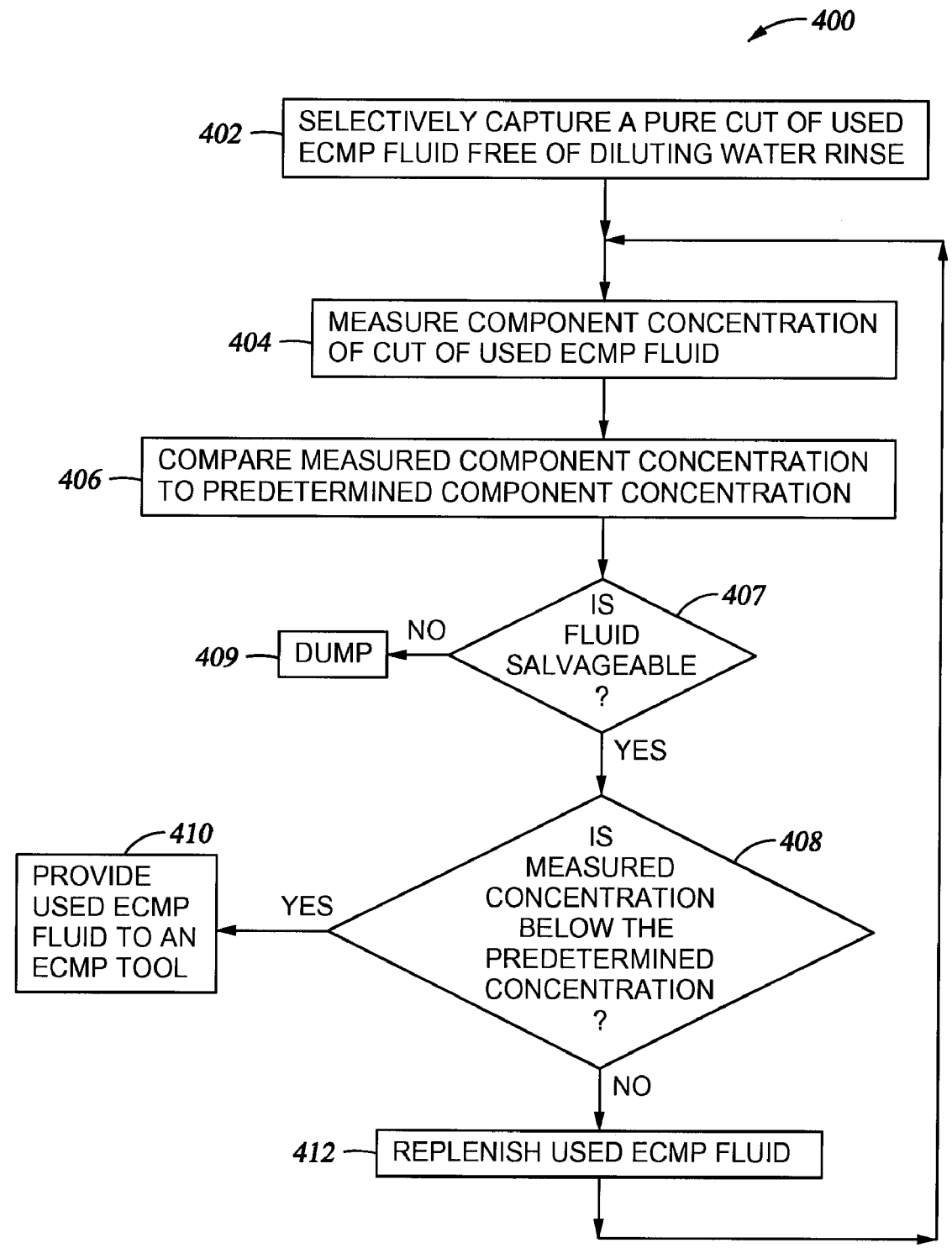
FIG. 4 is a flow chart 400 for recycling ECMP fluid according to one embodiment of the invention.

FIG. 4 is a flow chart 400 for one embodiment of the invention. According to the embodiment shown in FIG. 4, a pure cut of ECMP fluid is selectively captured (step 402). The pure cut (i.e., selected portion) is chosen as described above. The concentration of the components in the selected portion may then be measured (step 404). Alternatively, the pH of the portion or the conductivity of the portion may be measured. The measured concentration (or pH or conductivity) is then compared to a predetermined component concentration (step 406). Based upon the measurement, a determination is made as to whether or not the fluid is salvageable (Step 407). If the fluid is no salvageable, it may be dumped (Step 409). If the fluid is salvageable, then a decision may be made as to whether or not to use the selected portion in its present form (step 408). If the measured concentration is below the predetermined vale, then the selected portion may be provided to an ECMP tool (step 410). If not, then the selected portion may be replenished further (step 412) by repeating steps 404, 406, and 408 until the measured concentration is below the predetermined value.

Figure 5A:
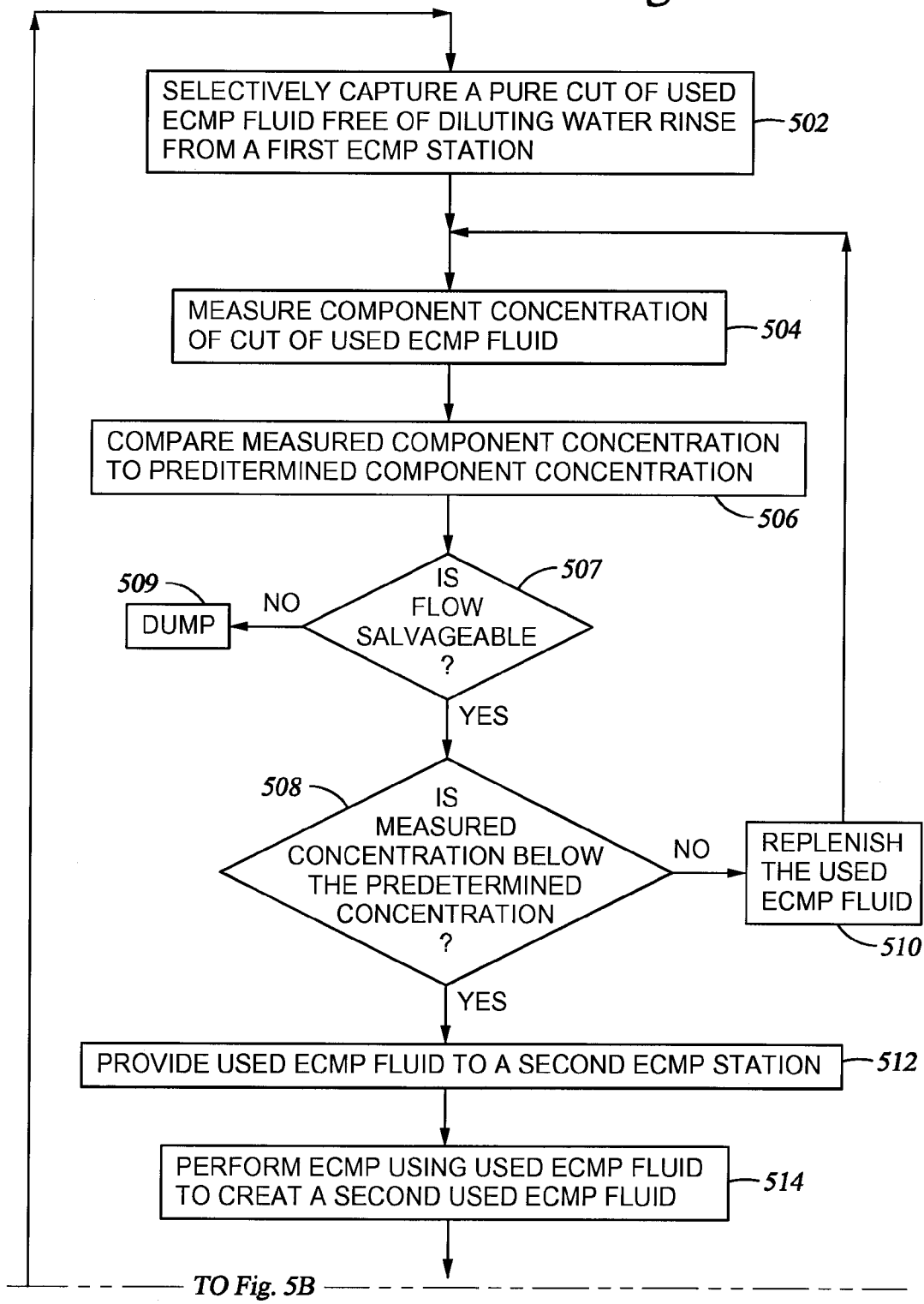
FIG. 5 is a flow chart 500 for recycling ECMP fluid according to another embodiment of the invention.
Figure 5B:
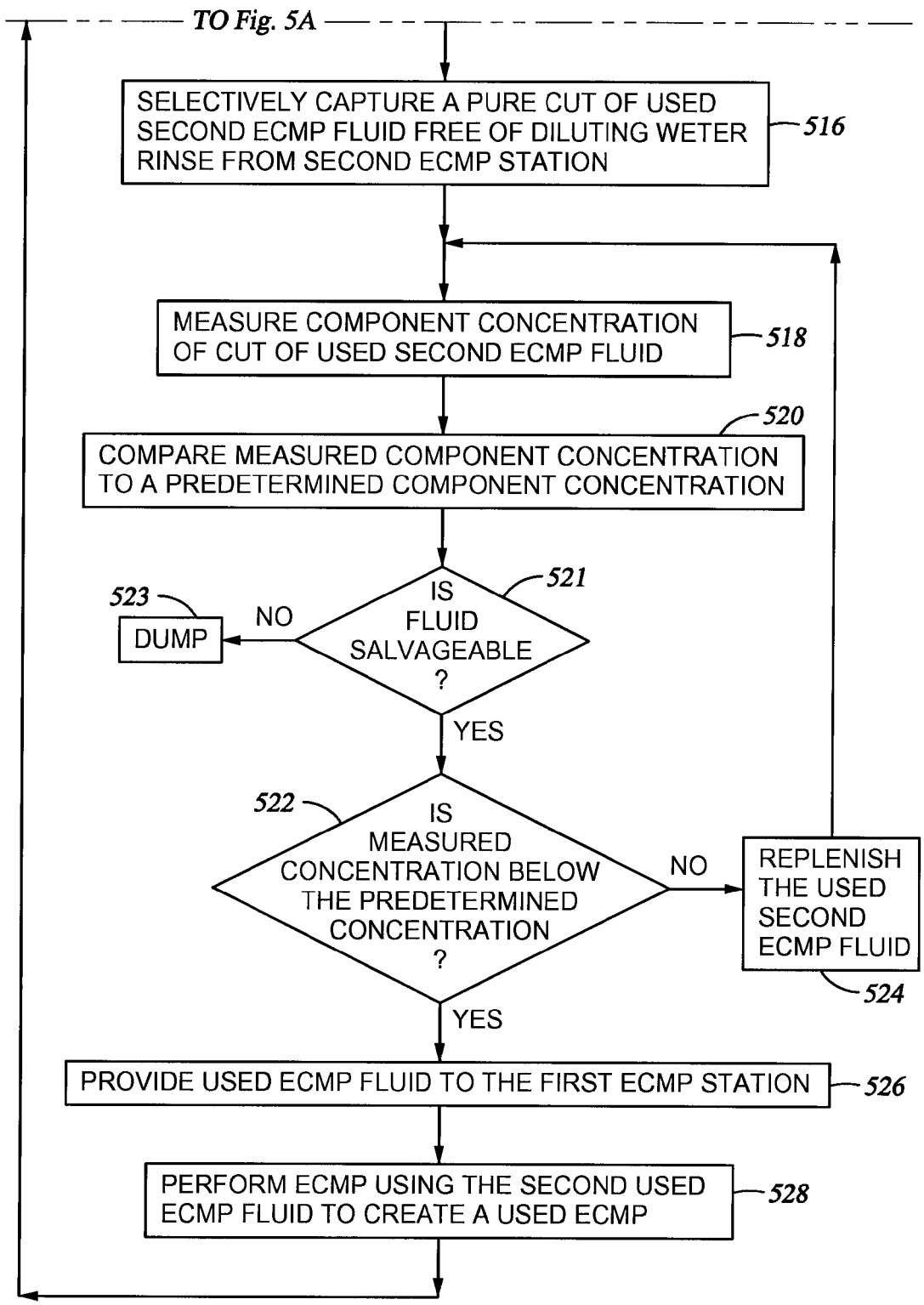

FIG. 5 is a flow chart 500 for another embodiment of the invention. According to the embodiment shown in FIG. 5, a pure cut of ECMP fluid is selectively captured from a first ECMP station (step 502). The selected portion is chosen as described above. The concentration of the components in the selected portion may then be measured (step 504). Alternatively, the pH of the portion or the conductivity of the portion may be measured. The measured concentration (or pH or conductivity) is then compared to a predetermined component concentration (step 506). Based upon the measurement, a determination is made as to whether or not the fluid is salvageable (Step 507). If the fluid is no salvageable, it may be dumped (Step 509). If the fluid is salvageable, then a decision may be made as to whether or not to use the selected portion in its present form (step 508). If the measured concentration is below the predetermined vale, then the selected portion may be provided to a second ECMP tool (step 512). If not, then the selected portion may be replenished further (step 510) by repeating steps 504, 506, and 508 until the measured concentration is below the predetermined value.

The replenished selected portion of ECMP fluid from the first ECMP station may be used to perform an ECMP process on the second ECMP station (step 514). Thereafter, a selected portion of ECMP fluid may be selectively captured from the second ECMP station (step 516). The selected portion is chosen as described above. The concentration of the components in the selected portion may then be measured (step 518). Alternatively, the pH of the portion or the conductivity of the portion may be measured. The measured concentration (or pH or conductivity) is then compared to a predetermined component concentration (step 520). Based upon the measurement, a determination is made as to whether or not the fluid is salvageable (Step 521). If the fluid is no salvageable, it may be dumped (Step 523). If the fluid is salvageable, then a decision may be made as to whether or not to use the selected portion in its present form (step 522). If the measured concentration is below the predetermined vale, then the selected portion may be provided to the first station (step 526)

wherein an ECMP process may be performed using the recycled ECMP fluid from the second ECMP station (step 528). If not, then the selected portion may be replenished further (step 524) by repeating steps 518, 520, and 522 until the measured concentration is below the predetermined value.

In each of the embodiments described herein, the ECMP fluid may reach the point where it is beyond the point of replenishment. Once the used fluid is considered to be beyond the point of replenishment, a decision may be made to dispose of the fluid or otherwise discarded the fluid.

In one embodiment, a process sequence may proceed as follows. A substrate is initially provided to a first platen of a first ECMP station within an ECMP tool having at least two separate ECMP stations. An ECMP fluid may then be provided while the substrate is polished in a bulk polishing step. After the bulk polishing has been completed, the used ECMP fluid may be drained from the first ECMP station and a selected portion of the used ECMP fluid may be captured. The selected portion of used ECMP fluid from the first ECMP station may be measured to determine the copper concentration, the contaminant concentration, and starting material concentration, the conductivity, and/or the pH. Simultaneously, the first ECMP station may be rinsed with deionized water. Following the measuring, the selected portion of used ECMP fluid may be refurbished by stripping copper, removing contaminants, diluting the ECMP fluid with unused fluid, and/or selectively dosing the selected portion of used ECMP fluid with individual components of the ECMP fluid. The substrate may then be moved to the second ECMP station where unused ECMP fluid and at least a portion of the recycled ECMP fluid from the first ECMP station are provided for polishing. The substrate is then polished to remove residual material not removed in the bulk removal process. During the polishing of the substrate at the second ECMP station, another substrate is being processed at the first ECMP station in a manner as described above. A selected portion of ECMP fluid from the second ECMP station may then be drained to the same recycling unit as was used to recycle the ECMP fluid from the first station where it is processed in a manner as described above. The selected portion of used ECMP fluid from the second ECMP station may then be measured as described above and combined with selected portions of used fluid from the first ECMP station. Thereafter, the combined selected portions of used ECMP fluid may be processed and supplied to both the first and second ECMP stations as further substrates are processed.

In another embodiment, a process sequence may proceed as follows. A substrate may be provided to a first ECMP station of an ECMP tool having at least two separate ECMP stations. A first ECMP fluid may be provided to the first ECMP station to polish the substrate. Thereafter, a selected portion of the used ECMP fluid may be drained to a recycling unit and may be measured to determine the copper concentration, the contaminant concentration, and starting material concentration, the conductivity, and/or the pH. Simultaneously, deionized water may be provided to the first ECMP station to rinse the first ECMP station. The selected portion of used ECMP fluid from the first ECMP station may be refurbished in a manner described above. The substrate may be moved to a second ECMP station where a second ECMP fluid may be provided to polish the substrate. A selected portion of used ECMP fluid from the second ECMP station may be recycled in a manner similar to that performed on the selected portion of used ECMP fluid from the first ECMP station, but the selected portion of used ECMP fluid from the second ECMP station may be recycled in a separate recycling unit. When the substrate is moved to the second ECMP station, another substrate may be provided to the first ECMP station and the recycled ECMP fluid from the first ECMP station, in addition to unused first ECMP fluid may be provided to the first ECMP station. After both substrates have been processed, the first ECMP fluid may again be recycled to the first ECMP station while the substrate is moved to the second ECMP station where it is polished with a combination of recycled second ECMP fluid and unused second ECMP fluid.

In still another embodiment, a process sequence may proceed as follows. A substrate may be provided to an ECMP station. A first ECMP fluid may be provided to the ECMP station to polish the substrate. After the polishing, a selected portion of the first ECMP fluid may be drained into a first recycling unit where it may be recycled as described above. After the selected portion of ECMP fluid is drained, deionized water may be provided to the ECMP station to rinse the station. Thereafter a second ECMP fluid, different from the first ECMP fluid, may be provided to the ECMP station to polish the substrate. Thereafter, a selected portion of the second ECMP fluid may be drained to a second recycling unit where it may be recycled as described above. Thereafter, the substrate may be removed and the ECMP station may again be rinsed. A second substrate may then be provided to the ECMP station. The second substrate may be polished with unused first ECMP fluid and recycled ECMP fluid. A selected portion of the used ECMP fluid may then be drained from the ECMP station and recycled as described above. The ECMP station may be rinsed with deionized water. The substrate may then be polished with unused second ECMP fluid and recycled second ECMP fluid. A selected portion of the used ECMP fluid may then be drained and recycled again as described above.

In yet another embodiment, a process sequence may proceed as follows. A substrate may be provided to an ECMP station. A first ECMP fluid may be provided to the ECMP station to polish the substrate. After the polishing, a selected portion of the first ECMP fluid may be drained into a recycling unit where it may be recycled as described above to match the characteristics of a second ECMP fluid. After the selected portion of ECMP fluid is drained, deionized water may be provided to the ECMP station to rinse the station. Thereafter the second ECMP fluid, different from the first ECMP fluid, may be provided to the ECMP station along with the recycled ECMP fluid to polish the substrate. Thereafter, a selected portion of the second ECMP fluid may be drained to the recycling unit where it may be recycled as described above to match the characteristics of the first ECMP fluid. Thereafter, the substrate may be removed and the ECMP station may again be rinsed. A second substrate may then be provided to the ECMP station. Thereafter, a second substrate may be polished with unused ECMP fluid and recycled ECMP fluid in a manner similar to that described above in relation to the first substrate.

It invention has been described above in relation to ECMP fluids, but it should be understood that the invention is equally applicable to hybrid ECMP fluids wherein hybrid ECMP fluids contain abrasive particles in the fluid. When using hybrid ECMP fluids, replenishment may additionally involve separating out the abrasive particles. The hybrid ECMP fluids should be drained from a separate drain than ECMP fluids that do not contain abrasive particles so that abrasive particles do not intermix with ECMP fluids that do not contain abrasives. Intermixing may contaminate the ECMP fluids that do not contain abrasive particles.

Thus, an ECMP fluid may be recycled and refurbished to be used multiple times. Recycling and refurbishing the ECMP fluid may provide a seasoning affect so that the recycled and refurbished ECMP fluid may operate more effectively and efficiently than a virgin ECMP fluid. By recycling selected portions of used ECMP fluid, ECMP processing may proceed in a more efficient manner.

While the foregoing is directed to embodiments of the present invention, other and further embodiments of the invention may be devised without departing from the basic scope thereof, and the scope thereof is determined by the claims that follow.

The invention claimed is:

1. An electrochemical mechanical polishing fluid recycling method, comprising:
   selectively capturing a first portion of used electrochemical mechanical polishing fluid from a first electrochemical mechanical polishing station, the used electrochemical mechanical polishing fluid being free of excess water from rinse or other process steps, the selective capturing leaving at least a second portion of used electrochemical mechanical polishing fluid uncaptured;
   refurbishing the first selected portion to create a first refurbished electrochemical mechanical polishing fluid;
   providing the first refurbished electrochemical mechanical polishing fluid to an electrochemical mechanical polishing station for use as an electrochemical mechanical polishing fluid;
   selectively capturing a third portion of used electrochemical mechanical polishing fluid from a second electrochemical mechanical polishing station different from the first electrochemical mechanical polishing station, the used electrochemical mechanical polishing fluid being free of excess water from rinse or other process steps, the selective capturing leaving at least a fourth portion of used electrochemical mechanical polishing fluid uncaptured;
   refurbishing the third selected portion to create a third refurbished electrochemical mechanical polishing fluid; and
   providing the third refurbished electrochemical mechanical polishing fluid to an electrochemical mechanical polishing station for use as an electrochemical mechanical polishing fluid.

2. The method of claim 1, wherein the first refurbished electrochemical mechanical polishing fluid is provided to the first electrochemical mechanical polishing station.

3. The method of claim 1, wherein the first refurbished electrochemical mechanical polishing fluid is provided to the second electrochemical mechanical polishing station.

4. The method of claim 1, wherein the third refurbished electrochemical mechanical polishing fluid is provided to the second electrochemical mechanical polishing station.

5. The method of claim 1, wherein the third refurbished electrochemical mechanical polishing fluid is provided to the first electrochemical mechanical polishing station.

6. The method of claim 1, further comprising:
   measuring a composition of the components of the first and third selected portions by performing a measuring process selected from the group consisting of Raman spectroscopy, UV-visible spectroscopy, infrared spectroscopy, near-infrared spectroscopy, index of refraction, measuring the conductivity of the selected portion, measuring the pH of the selected portion, and combinations thereof.

7. The method of claim 1, wherein the refurbishing further comprises:
   measuring a composition of the components of the first and third selected portions;
   comparing the measured composition of the first and third selected portions to a predetermined composition; and
   selectively dosing a quantity of at least one component that comprises the electrochemical mechanical polishing fluid into the first and third selected portions, the selective dosing quantity is an amount sufficient to change the measured composition of the at least one component to a composition equal to the predetermined composition.

8. The method of claim 1, wherein the refurbishing comprises:
   measuring a pH of the components of the first and third selected portions;
   comparing the measured pH of the first and third selected portions to a predetermined pH value; and
   adjusting the pH of the first and third selected portions by adding acid or base or pH buffing agents to the first and third selected portions, the adjusting comprising adding sufficient base or acid to change the measured pH of the first and third selected portions to equal the predetermined pH value.

9. The method of claim 1, wherein at least one of the first and third selected portion portions of electrochemical mechanical polishing fluid contains abrasive particles and the refurbishing comprises removing the abrasive particles from the selected portion of electrochemical mechanical polishing fluid.

10. The method of claim 1, wherein the refurbishing comprises blending fresh fluid with the first and third selected portions at a predetermined ratio to dilute a copper content of the first and third selected portions to an acceptable level.

* * * * *

UNITED STATES PATENT AND TRADEMARK OFFICE
CERTIFICATE OF CORRECTION

| | | |
|---|---|---|
| PATENT NO. | : 7,651,384 B2 | Page 1 of 1 |
| APPLICATION NO. | : 11/621497 | |
| DATED | : January 26, 2010 | |
| INVENTOR(S) | : Golden et al. | |

It is certified that error appears in the above-identified patent and that said Letters Patent is hereby corrected as shown below:

In the Claims:

Column 14, Claim 9, Line 41, please delete "portion".

Signed and Sealed this

Sixth Day of April, 2010

David J. Kappos
*Director of the United States Patent and Trademark Office*